US012559432B2

(12) United States Patent
Kurizoe et al.

(10) Patent No.: US 12,559,432 B2
(45) Date of Patent: Feb. 24, 2026

(54) COMPOSITE MEMBER

(71) Applicant: Panasonic Intellectual Property Management Co., Ltd., Osaka (JP)

(72) Inventors: Naoki Kurizoe, Osaka (JP); Ryosuke Sawa, Osaka (JP); Natsuki Sato, Osaka (JP); Tatsuro Yoshioka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 773 days.

(21) Appl. No.: 17/762,069

(22) PCT Filed: Aug. 25, 2020

(86) PCT No.: PCT/JP2020/032038
§ 371 (c)(1),
(2) Date: Mar. 20, 2022

(87) PCT Pub. No.: WO2021/065253
PCT Pub. Date: Apr. 8, 2021

(65) Prior Publication Data
US 2022/0371964 A1 Nov. 24, 2022

(30) Foreign Application Priority Data
Sep. 30, 2019 (JP) ................................. 2019-178350

(51) Int. Cl.
*C04B 35/636* (2006.01)
*C04B 35/453* (2006.01)
*C04B 35/80* (2006.01)

(52) U.S. Cl.
CPC ........ *C04B 35/6365* (2013.01); *C04B 35/453* (2013.01); *C04B 35/80* (2013.01);
(Continued)

(58) Field of Classification Search
CPC ... C04B 35/6365; C04B 35/453; C04B 35/80; C04B 2235/3284; C04B 2235/5212
See application file for complete search history.

(56) References Cited

U.S. PATENT DOCUMENTS

2013/0122267 A1* 5/2013 Riman .................. C04B 28/188
428/448

FOREIGN PATENT DOCUMENTS

EP 1190995 A1 3/2002
JP S58-11378 B2 3/1983
(Continued)

OTHER PUBLICATIONS

Abu-Jdayil, Basim, et al. "Traditional, state-of-the-art and renewable thermal building insulation materials: An overview." Construction and Building Materials 214 (2019): 709-735. (Year: 2019).*
(Continued)

*Primary Examiner* — Cameron K Miller
(74) *Attorney, Agent, or Firm* — Renner, Otto, Boisselle & Sklar, LLP

(57) ABSTRACT

A composite member includes an inorganic matrix part made from an inorganic substance including at least one of a metal oxide or a metal oxide hydroxide and an organic fiber that is directly fixed to the inorganic matrix part without interposing an adhesive substance different from the inorganic substance making up the inorganic matrix part and is present in a dispersed state within the inorganic matrix part. The composite member has a porosity of 20% or less in a section of the inorganic matrix part.

10 Claims, 5 Drawing Sheets

(52) U.S. Cl.
CPC ................. *C04B 2235/3284* (2013.01); *C04B 2235/5212* (2013.01)

(56) References Cited

FOREIGN PATENT DOCUMENTS

| | | | |
|---|---|---|---|
| JP | H03-115148 | A1 | 5/1991 |
| JP | H04-130041 | A1 | 5/1992 |
| JP | H06-49604 | A1 | 6/1994 |
| JP | H06-49604 | B2 | 6/1994 |
| JP | 10-101450 | A | 4/1998 |
| JP | 11-226925 | A | 8/1999 |
| JP | 2001-302312 | A1 | 10/2001 |
| JP | 2002-087861 | A1 | 3/2002 |
| JP | 2009-179549 | A | 8/2009 |
| JP | 2015-155357 | A | 8/2015 |
| JP | 2016-79202 | A | 5/2016 |
| JP | 2019-524621 | A | 9/2019 |
| WO | WO-2014184393 | A1 * | 11/2014 ............ C04B 30/02 |
| WO | 2018/007409 | A1 | 1/2018 |

OTHER PUBLICATIONS https://pubchem.ncbi.nlm.nih.gov/compound/Kaolin Accessed Nov. 21, 2024 (Year: 2024).* https://www.americanelements.com/fumed-silica-112945-52-5 Accessed Nov. 21, 2024 (Year: 2024).* https://pubchem.ncbi.nlm.nih.gov/compound/Silicon-carbide Accessed Nov. 21, 2024 (Year: 2024).* https://www.kaminllc.com/whatiskaolin.html#:~:text=Kaolin%20(china%20clay)%20is%20a,purity%20and%20fine%20particle%20structure. Accessed Nov. 21, 2024 (Year: 2024).*

Yahaya, Shehu, et al. "Chemical composition and particle size analysis of kaolin." Traektoriâ Nauki= Path of Science 3.10 (2017): 1001-1004 (Year: 2017).*

Chinga-Carrasco, Gary. "Cellulose fibres, nanofibrils and microfibrils: The morphological sequence of MFC components from a plant physiology and fibre technology point of view." Nanoscale research letters 6 (2011): 1-7 (Year: 2011).*

Daicho, Kazuho, et al. "Crystallinity-independent yet modification-dependent true density of nanocellulose." Biomacromolecules 21.2 (2019): 939-945 (Year: 2019).* https://pubchem.ncbi.nlm.nih.gov/compound/Silicon-carbide Accessed Apr. 14, 2025 (Year: 2025).* https://www.americanelements.com/fumed-silica-112945-52-5 Accessed Apr. 14, 2025 (Year: 2025).* https://pubchem.ncbi.nlm.nih.gov/compound/Kaolin Accessed Apr. 14, 2025 (Year: 2025).*

Li, Haiyan, et al. "Role of the structure of synthetic Al (OH) 3 on the properties of sulfoaluminate cement-based materials." Cement and Concrete Research 174 (2023): 107330. (Year: 2023).*

International Search Report for corresponding Application No. PCT/JP2020/032038, mailed Oct. 20, 2020.

Written Opinion for corresponding Application No. PCT/JP2020/032038, mailed Oct. 20, 2020.

Extended European Search report for corresponding EP Application No. 20870871.9, issued Oct. 25, 2022.

Wang, et al.; "Refractory Castable Materials and Their Technical Development"; Metallurgical Industry Press; Apr. 2015; p. 71-72, ISBN 978-7-5024-6873-6, with English translation.

* cited by examiner (a)

SECONDARY ELECTRON IMAGE
(POSITION 1)

(b)

BINARIZED DATA (POSITION 1)

(a)

SECONDARY ELECTRON IMAGE (POSITION 2)

(b)

BINARIZED DATA (POSITION 2)

(a)

SECONDARY ELECTRON IMAGE (POSITION 3)

(b)

BINARIZED DATA (POSITION 3)

COMPOSITE MEMBER

TECHNICAL FIELD

The present invention relates to a composite member.

BACKGROUND ART

Ceramics are known to have high strength and heat resistance, but they are also known to be difficult to strain. Thus, when a load is applied to ceramics, sudden fracture may occur due to their low ability to relieve the load. To improve such properties, researches to improve strength by blending fibers in ceramics have been actively conducted.

Patent Literature 1 discloses an admixture for cement containing a masterbatch (A) containing a cellulose nanofiber obtained by micronizing cellulose in a polyester-based resin, a maleic anhydride copolymer resin (B), and water (C). It is also described that adding the admixture for cement to a cement composition enables the cellulose nanofiber to be uniformly dispersed in the cement composition, thereby improving strength of a cement molded body, such as concrete or mortar.

CITATION LIST

Patent Literature

Patent Literature 1: Japanese Unexamined Patent Application Publication No. 2015-155357

SUMMARY OF INVENTION

However, since the cement molded body is mainly made from a hydrate and has many pores, the obtained molded body may have insufficient mechanical strength even if a fiber is mixed. Further, when a large number of pores are present in the cement molded body, the fiber comes into contact with the atmosphere, so that the fiber may oxidize and deteriorate by long-term use.

The present invention has been made in consideration of such issues as described above, which is inherent in related art. An object of the present invention is to provide a composite member that is stable for a long time and further has excellent mechanical strength, even when an organic fiber is used.

To solve the above issue, a composite member according to a first aspect of the present invention includes: an inorganic matrix part made from an inorganic substance including at least one of a metal oxide or a metal oxide hydroxide; and an organic fiber that is directly fixed to the inorganic matrix part without interposing an adhesive substance different from the inorganic substance making up the inorganic matrix part and is present in a dispersed state within the inorganic matrix part. The composite member has a porosity of 20% or less in a section of the inorganic matrix part.

BRIEF DESCRIPTION OF DRAWINGS

FIG. 2(*b*) is a schematic sectional view of the vicinity of grain boundaries of a particle group of an inorganic substance.

FIG. 5(*a*) is a diagram illustrating a secondary electron image at position 1 in a test sample according to example 2. FIG. 5(*b*) is a diagram illustrating binarized data of the secondary electron image at position 1 in the test sample according to example 2.

FIG. 6(*b*) is a diagram illustrating binarized data of the secondary electron image at position 2 in the test sample according to example 2.

FIG. 7(*b*) is a diagram illustrating binarized data of the secondary electron image at position 3 in the test sample according to example 2.

DESCRIPTION OF EMBODIMENTS

Figure 1:
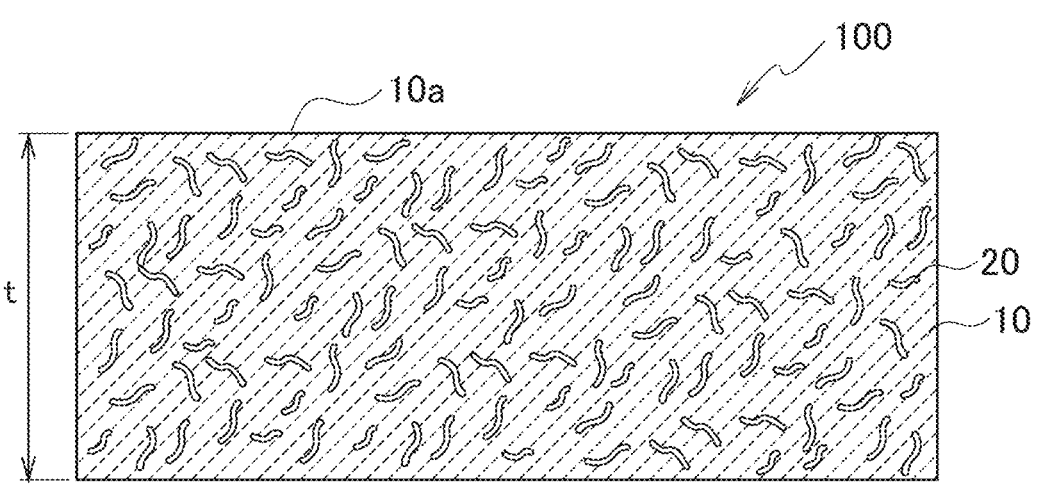
FIG. 1 is a schematic sectional view of an example of a composite member according to a present embodiment.

Referring to the drawings, a description is given below of a composite member according to a present embodiment. Note that dimensional ratios in the drawings are exaggerated for convenience of explanation and are sometimes different from actual ratios.

[Composite Member]

As illustrated in FIG. 1, a composite member 100 according to the present embodiment includes an inorganic matrix part 10 and an organic fiber 20 directly fixed to the inorganic matrix part 10 without interposing an adhesive substance different from an inorganic substance making up the inorganic matrix part 10. In the composite member 100, the organic fiber 20 is fixed to the inorganic matrix part 10 in a dispersed state within the inorganic matrix part 10.

Figure 2:
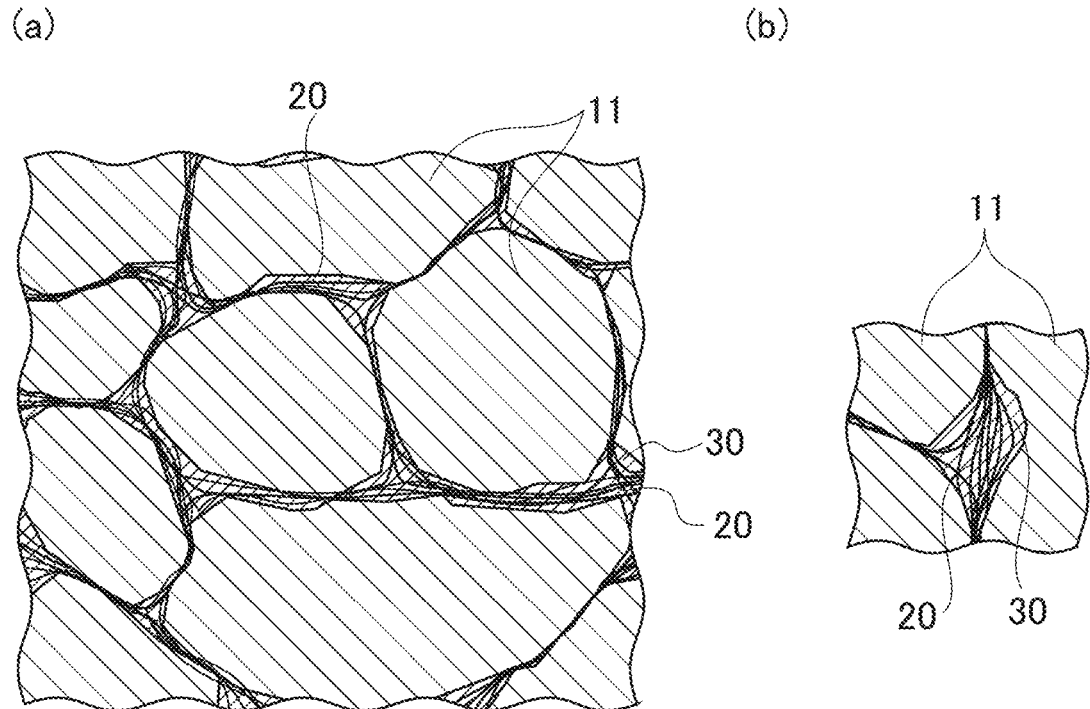
FIG. 2(*a*) is an enlarged schematic sectional view of the composite member in FIG. 1.

As illustrated in FIG. 2, the inorganic matrix part 10 includes multiple particles 11 made from the inorganic substance, and the particles 11 of the inorganic substance bond with each other to form the inorganic matrix part 10.

Preferably, the inorganic substance making up the inorganic matrix part 10 contains at least one metal element selected from the group consisting of an alkali metal, an alkaline earth metal, a transition metal, a base metal, and a semimetal. In this description, the alkaline earth metal includes beryllium and magnesium in addition to calcium, strontium, barium, and radium. The base metal includes aluminum, zinc, gallium, cadmium, indium, tin, mercury, thallium, lead, bismuth, and polonium. The semimetal includes boron, silicon, germanium, arsenic, antimony, and tellurium. Among these, preferably, the inorganic substance contains at least one metal element selected from the group consisting of zinc, aluminum, and magnesium. As described later, it is possible for the inorganic substance containing the metal element described above to easily form a connection part derived from the inorganic substance by a pressure heating method.

More preferably, the inorganic substance contains at least one of an oxide or an oxide hydroxide of the above-described metal element, as a main component. That is, preferably, the inorganic substance contains at least one of an oxide or an oxide hydroxide of the above-described metal element in an amount of 50 mol % or more, more preferably, in an amount of 80 mol % or more. Note that the oxide of the above-described metal element includes a phosphate, a silicate, an aluminate, and a borate in addition to a compound in which only oxygen is bonded to the metal element. Such an inorganic substance has high stability against oxygen and water vapor in the atmosphere. Accordingly, dispersing the organic fiber 20 inside the inorganic matrix part 10 prevents the organic fiber 20 from contacting with oxygen and water vapor and thus prevents deterioration of the organic fiber 20.

Particularly preferably, the inorganic substance making up the inorganic matrix part 10 is an oxide. When the inorganic substance is made from an oxide of the above-described metal element, the composite member 100 with higher durability is obtained. Note that, preferably, the oxide of the metal element is a compound in which only oxygen is bonded to the metal element.

Preferably, the inorganic substance making up the inorganic matrix part 10 is a polycrystalline substance. That is, preferably, the particles 11 of the inorganic substance are crystalline particles, and preferably, the inorganic matrix part 10 is formed by aggregating a large number of particles 11. When the inorganic substance making up the inorganic matrix part 10 is a polycrystalline substance, the composite member 100 with higher durability is obtained compared to the case of the inorganic substance made from an amorphous substance. Note that, more preferably, the particles 11 of the inorganic substance are crystalline particles containing at least one metal element selected from the group consisting of an alkali metal, an alkaline earth metal, a transition metal, a base metal, and a semimetal. Preferably, the particles 11 of the inorganic substance are crystalline particles containing at least one of an oxide or an oxide hydroxide of the above-described metal element. More preferably, the particles 11 of the inorganic substance are crystalline particles containing at least one of an oxide or an oxide hydroxide of the above-described metal element, as a main component.

Note that preferably, the inorganic substance making up the inorganic matrix part 10 is boehmite. Boehmite is an aluminum oxide hydroxide represented by a composition formula of AlOOH. Boehmite is insoluble in water and hardly reacts with acids and alkalis at room temperature, having high chemical stability. Boehmite also has excellent heat resistance due to its high dehydration temperature of around 500° C. Since boehmite has the specific gravity of about 3.07, when the inorganic matrix part 10 is made from boehmite, the composite member 100 that is lightweight and excellent in chemical stability is obtained.

When the inorganic substance making up the inorganic matrix part 10 is boehmite, the particles 11 may be particles only of a boehmite phase, or particles of a mixed phase of boehmite, and an aluminum oxide or an aluminum hydroxide other than boehmite. For example, the particles 11 may be a mixture of a phase of boehmite and a phase of gibbsite (Al(OH)$_3$).

As described above, more preferably, the inorganic substance making up the inorganic matrix part 10 contains at least one of an oxide or an oxide hydroxide as a main component. Thus, preferably, the inorganic matrix part 10 also contains at least one of an oxide or an oxide hydroxide as a main component. That is, preferably, the inorganic matrix part 10 contains at least one of the oxide or the oxide hydroxide in an amount of 50 mol % or more, more preferably, in amount of 80 mol % or more. However, preferably, the inorganic matrix part 10 substantially contains no hydrate. In this description, "an inorganic matrix part substantially contains no hydrate" means that the inorganic matrix part 10 does not intentionally contain a hydrate. Thus, when a hydrate is mixed into the inorganic matrix part 10 as an unavoidable impurity, the condition of "an inorganic matrix part substantially contains no hydrate" is satisfied. Note that since boehmite is an oxyhydroxide, it is not included in the hydrate in this description.

Note that preferably, the inorganic substance making up the inorganic matrix part 10 does not contain a hydrate of a calcium compound. The calcium compound here is tricalcium silicate (alite, 3CaO·SiO$_2$), dicalcium silicate (belite, 2CaO·SiO$_2$), calcium aluminate (3CaO·Al$_2$O$_3$), calcium aluminoferrite (4CaO·Al$_2$O$_3$·Fe$_2$O$_3$), or calcium sulfate (CaSO$_4$·2H$_2$O). When the inorganic substance making up the inorganic matrix part 10 contains a hydrate of the above-described calcium compound, the obtained composite member may have a porosity exceeding 20% in the section of the inorganic matrix part, thereby having reduced strength. Thus, preferably, the inorganic substance does not contain the above-described hydrated calcium compound. Preferably, the inorganic substance making up the inorganic matrix part 10 does not contain phosphate cement, zinc phosphate cement, and calcium phosphate cement. When the inorganic substance does not contain these cements, the porosity of the inorganic matrix part in the section decreases, which enhances the mechanical strength.

The average particle size of the particles 11 of the inorganic substance making up the inorganic matrix part 10 is not limited. However, the average particle size of the particles 11 is preferably 300 nm or more and 50 μm or less, more preferably 300 nm or more and 30 μm or less, still more preferably 300 nm or more and 10 μm or less, particularly preferably 300 nm or more and 5 μm or less. When the average particle size of the particles 11 of the inorganic substance is within this range, the particles 11 firmly bond with each other, increasing the strength of the inorganic matrix part 10. When the average particle size of the particles 11 of the inorganic substance is within this range, the ratio of pores present inside the inorganic matrix part 10 is 20% or less, which prevents the oxidative deterioration of the organic fiber 20. In this description, the value of "average particle size" is, unless otherwise stated, a value calculated as an average value of particle size of particles observed in several to several tens of visual fields by using observation means, such as a scanning electron microscope (SEM) or a transmission electron microscope (TEM).

The shape of the particles 11 of the inorganic substance is not limited but may have a spherical shape, for example. The particles 11 may have a whisker shape (acicular shape) or a scale shape. The particles having a whisker shape or the particles having a scale shape have higher contact with other particles compared to the spherical particles, which easily improves the strength of the inorganic matrix part 10. Therefore, using particles of such a shape for the particles 11 enhances the strength of the entire composite member 100. As the particles 11, which have a whisker shape, for example, particles containing at least one of a zinc oxide (ZnO) or an aluminum oxide (Al$_2$O$_3$) are usable.

As described above, preferably, the inorganic matrix part 10 includes a group of particles of an inorganic substance in the composite member 100. That is, preferably, the inorganic matrix part 10 includes the multiple particles 11 made from the inorganic substance, and the particles 11 of the inorganic substance bond with each other to form the inorganic matrix part 10. In this case, the particles 11 may be in point contact with each other, or in surface contact with each other by particle surfaces of the particles 11. Preferably, the organic fiber 20 is present in an approximately uniformly dispersed state inside the inorganic matrix part 10. However, preferably, the organic fiber 20 is present at grain boundaries of the particles 11 of the inorganic substance. As illustrated in FIG. 2, by unevenly distributing the organic fiber 20 among adjacent particles 11 of the inorganic substance, the organic fiber 20 deforms to fill gaps among the particles 11 of the inorganic substance. This enables the ratio of pores present within the inorganic matrix part 10 to be further reduced.

When the inorganic matrix part 10 includes the group of particles of the inorganic substance in the composite member 100, the organic fiber 20 may be present among adjacent particles 11 of the inorganic substance. However, as illustrated in FIG. 2, in addition to the organic fiber 20, there may be an amorphous part 30 containing an amorphous inorganic compound among the adjacent particles 11 of the inorganic substance. The presence of the amorphous part 30 enables the adjacent particles 11 of the inorganic substance to bond with each other via the amorphous part 30, further increasing the strength of the inorganic matrix part 10. Note that preferably, the amorphous part 30 is present to contact at least surfaces of the particles 11 of the inorganic substance. The amorphous part 30 may be present between the particles 11 of the inorganic substance and the organic fiber 20 and among the adjacent organic fiber 20 in addition to among the adjacent particles 11 of the inorganic substance.

Preferably, the amorphous part 30 contains an amorphous inorganic compound. Specifically, the amorphous part 30 may be a part made from only the amorphous inorganic compound or a part of a mixture of the amorphous inorganic compound and a crystalline inorganic compound. The amorphous part 30 may be a part in which the crystalline inorganic compound is dispersed inside the amorphous inorganic compound.

Preferably, the particles 11 of the inorganic substance and the amorphous part 30 contain the same metal element, and preferably, the metal element is at least one selected from the group consisting of an alkali metal, an alkaline earth metal, a transition metal, a base metal, and a semimetal. That is, preferably, the inorganic compound making up the particles 11 and the amorphous inorganic compound making up the amorphous part 30 contain at least the same metal element. The inorganic compound making up the particles 11 and the amorphous inorganic compound making up the amorphous part 30 may have the same chemical composition or may have different chemical compositions. Specifically, when the metal element is zinc, the inorganic compound making up the particles 11 and the amorphous inorganic compound making up the amorphous part 30 may both be a zinc oxide (ZnO). Alternatively, while the inorganic compound making up the particles 11 is ZnO, the amorphous inorganic compound making up the amorphous part 30 may be a zinc-containing oxide other than ZnO.

When the amorphous part 30 is a part in which the amorphous inorganic compound and the crystalline inorganic compound are mixed, the amorphous inorganic compound and the crystalline inorganic compound may have the same chemical composition or may have different chemical compositions from each other.

In the composite member 100, preferably, the particles 11 and the amorphous part 30 contain an oxide of at least one metal element selected from the group consisting of an alkali metal, an alkaline earth metal, a transition metal, a base metal, and a semimetal. Since the oxide of such a metal element has high durability, the organic fiber 20 is prevented from contacting with oxygen and water vapor for a long time, and deterioration of the organic fiber 20 is prevented.

Preferably, the oxide of the metal element contained in both the particles 11 and the amorphous part 30 is at least one selected from the group consisting of a zinc oxide, a magnesium oxide, and a composite of a zinc oxide and a magnesium oxide. As is described later, by using the oxide of the metal element described above, the amorphous part 30 is formed by a simple method.

As described above, the inorganic substance making up the inorganic matrix part 10 may be boehmite. In this case, the particles 11 of the inorganic matrix part 10 may be particles only of a boehmite phase, or particles of a mixed phase of boehmite, and an aluminum oxide or an aluminum hydroxide other than boehmite. In this case, preferably, the adjacent particles 11 are bonded through at least one of an oxide or an oxide hydroxide of aluminum. That is, preferably, the particles 11 are not bonded by an organic binder of an organic compound and are not also bonded by an inorganic binder of an inorganic compound except for an oxide and an oxide hydroxide of aluminum. Note that when the adjacent particles 11 are bonded through at least one of an oxide or an oxide hydroxide of aluminum, the oxide and the oxide hydroxide of the aluminum may be crystalline or amorphous.

When the inorganic matrix part 10 is made from boehmite, the presence ratio of the boehmite phase is preferably 50% by mass or more, more preferably 60% by mass or more, still more preferably 70% by mass or more. By increasing the ratio of the boehmite phase, the inorganic matrix part 10 that is lightweight and excellent in chemical stability and heat resistance is obtained. Note that the ratio of the boehmite phase in the inorganic matrix part 10 is obtained by measuring the X-ray diffraction pattern of the inorganic matrix part 10 by an X-ray diffraction method and then performing a Rietveld analysis.

In the composite member 100, preferably, the porosity in the section of the inorganic matrix part 10 is 20% or less. That is, when the section of the inorganic matrix part 10 is observed, preferably, the average value of the ratio of pores per unit area is 20% or less. When the porosity is 20% or less, the organic fiber 20 is sealed inside the dense inorganic substance. Thus, the ratio of the organic fiber 20 contacting with oxygen and water vapor from the outside of the composite member 100 decreases, which prevents the corrosion of the organic fiber 20 and maintains the properties of the organic fiber 20 for a long time. The porosity in the section of the inorganic matrix part 10 is preferably 15% or less, more preferably 10% or less, still more preferably 5% or less. As the porosity in the cross section of the inorganic matrix part 10 is smaller, the organic fiber 20 is further prevented from contacting with oxygen and water vapor, which prevents the oxidative deterioration of the organic fiber 20.

In this description, the porosity is determined as follows. First, the section of the inorganic matrix part 10 is observed to discriminate the inorganic matrix part 10, the organic fiber 20, and the pores. Then, the unit area and the area of pores in that unit area are measured to obtain the ratio of pores per unit area. After the ratio of pores per unit area is obtained at multiple locations, the average value of the ratio of pores per unit area is taken as the porosity. Note that when the section of the inorganic matrix part 10 is observed, an optical microscope, a scanning electron microscope (SEM), or a transmission electron microscope (TEM) is usable. The unit area and the area of pores in that unit area may be measured by binarizing an image observed with a microscope.

In the composite member 100, the organic fiber 20 is a fibrous substance made from an organic compound and has high strength based on its molecular weight. At least one of a plant fiber or an animal fiber is usable as the organic fiber 20. Examples of the plant fiber include a wood fiber, cotton, hemp, and kenaf. Examples of the animal fiber include silk, wool, and cashmere.

At least one of a regenerated fiber, a semi-synthetic fiber, or a synthetic fiber is also usable as the organic fiber 20. Examples of the regenerated fiber include rayon and lyocell. Examples of the semi-synthetic fiber include acetate and triacetate. Examples of the synthetic fiber include a polyamide fiber, a polyester fiber, a polyacrylonitrile fiber, a polyolefin fiber, a polyfluoroethylene fiber, a polyvinyl chloride fiber, a polyvinylidene chloride fiber, a polyvinyl alcohol fiber, and a polyurethane fiber.

The fiber length of the organic fiber 20 is not limited but is preferably from 1 nm to 10 mm, more preferably from 10 nm to 1 mm. The fiber diameter of the organic fiber 20 is not limited but is preferably 1 nm to 1 mm, more preferably 5 nm to 500 μm. Having such a fiber length and a fiber diameter enables the organic fiber 20 to be highly dispersed within the inorganic matrix part 10, which further enhances the mechanical strength of the composite member 100.

As described above, preferably, the organic fiber 20 is a petroleum-derived substance or a plant-derived substance. When the organic fiber 20 is a fiber obtained by processing petroleum or a fiber obtained by processing a plant, the fiber is stably obtainable, which provides the composite member 100 suitable for industrial production.

Preferably, the surface of the organic fiber 20 is hydrophilic. Specifically, preferably, the organic fiber 20 has a hydrophilic functional group on its surface. By the organic fiber 20 being hydrophilic, the organic fiber 20 is hardly aggregated when water is used as a solvent in the manufacturing process of the composite member 100, which enables the organic fiber 20 to be highly dispersed within the inorganic matrix part 10. Note that the surface of the organic fiber 20 may be treated to make it hydrophilic as necessary. Specifically, the surface of the organic fiber 20 may be made hydrophilic by treating with a silane coupling agent.

Preferably, the organic fiber 20 is a cellulose nanofiber (CNF). Since the cellulose nanofiber has properties of light weight, high strength, and low thermal expansibility, the cellulose nanofiber adheres to multiple particles 11 by being dispersed within the inorganic matrix part 10, thereby preventing damage of the inorganic matrix part 10. Since the cellulose nanofiber has a high affinity with water, when water is used as a solvent in the manufacturing process, the cellulose nanofiber is easily defibrated, which enables the cellulose nanofiber to be highly dispersed in the inorganic matrix part 10.

The cellulose nanofiber is not limited, but preferably, one obtained by a method that promotes nano-defibration of pulp as a raw material is used. Specifically, as the cellulose nanofiber, a carboxymethylated cellulose nanofiber having a carboxymethyl group introduced on its surface is usable. As the cellulose nanofiber, a TEMPO-oxidized cellulose nanofiber having a carboxy group introduced on its surface by using a TEMPO (2,2,6,6-tetramethylpiperidine-1-oxyl radical) as a catalyst is usable.

In the composite member 100 according to the present embodiment, as illustrated in FIG. 1, the organic fiber 20 is dispersed within the inorganic matrix part 10 in a state of being directly fixed to the inorganic matrix part 10. As described above, the inorganic matrix part 10 itself is formed by bonding the particles 11 of the inorganic substance to each other and thus has high hardness but is prone to brittle fracture. However, since the organic fiber 20 is dispersed within the inorganic matrix part 10, it becomes easier for the organic fiber 20 to connect the particles 11 of the inorganic substance each other. That is, by dispersing the organic fiber 20 in the inorganic matrix part 10, the organic fiber 20 is entangled with each other and also with the particles 11. Therefore, even when an external force is applied to the inorganic matrix part 10, generation of cracks or the like is prevented. Even if a crack is generated in the inorganic matrix part 10, the organic fiber 20 that is dispersed connects the cracked surfaces and prevents the inorganic matrix part 10 from breaking.

The composite member 100 has the porosity of 20% or less in the section. Thus, the ratio of the organic fiber 20 contacting with oxygen and water vapor decreases, which prevents the oxidative decomposition of the organic fiber 20 and maintains the mechanical strength of the composite member 100 for a longtime. Since the inorganic matrix part 10 has few internal pores, and the inorganic substance is dense, the composite member 100 has high strength.

The shape of the composite member 100 is not limited but may be, for example, a plate shape. A thickness t of the composite member 100 (inorganic matrix part 10) is not limited but may be, for example, 50 μm or more. The thickness t of the composite member 100 may be 1 mm or more. The thickness t of the composite member 100 may be 1 cm or more. The upper limit of the thickness t of the composite member 100 is not limited but may be, for example, 50 cm.

Figure 3:
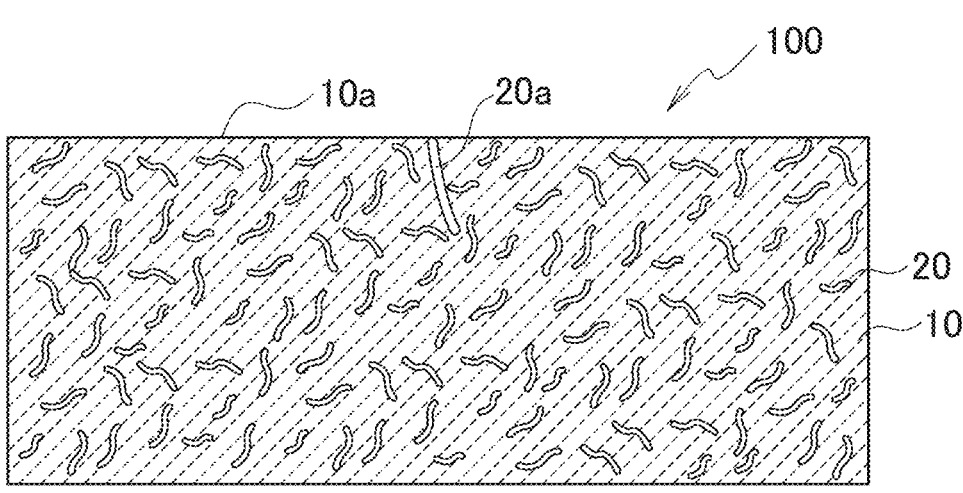
FIG. 3 is a schematic sectional view of another example of the composite member according to the present embodiment.

In the composite member 100, preferably, the organic fiber 20 is not continuously present from a surface 10a of the inorganic matrix part 10 to the inside of the inorganic matrix part 10 and is not present in a film shape on the surface 10a of the inorganic matrix part 10. Specifically, preferably, the organic fiber 20 is present in a dispersed state inside the inorganic matrix part 10. A part of the organic fiber 20 may be segregated inside the inorganic matrix part 10. However, preferably, an organic fiber 20a is not continuously present from the surface 10a to the inside of the inorganic matrix part 10 as illustrated in FIG. 3. The organic fiber 20a present on the surface 10a of the inorganic matrix part 10 may deteriorate by contact with oxygen and water vapor in the atmosphere. The organic fiber 20a continuously present from the surface 10a to the inside of the inorganic matrix part 10 may also deteriorate due to the oxidative deterioration of the organic fiber 20a present on the surface 10a. Therefore, from the viewpoint of preventing the deterioration of the organic fiber 20, preferably, the organic fiber 20 is not continuously present from the surface 10a to the inside of the inorganic matrix part 10.

Figure 4:
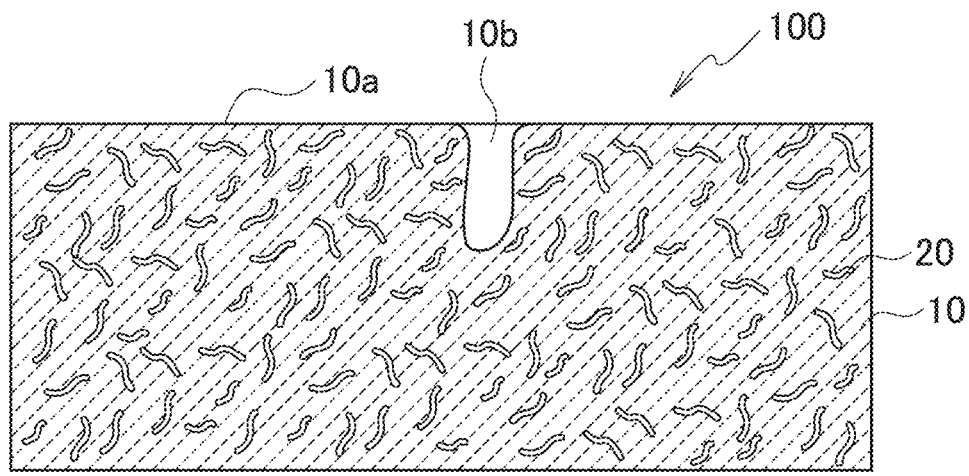
FIG. 4 is a schematic sectional view of another example of the composite member according to the present embodiment.

In the composite member 100, preferably, the inorganic matrix part 10 has no gap 10b communicating from the surface 10a to the inside of the inorganic matrix part 10. The organic fiber 20 inside the inorganic matrix part 10 is covered with the particles 11 of the inorganic substance and thus hardly oxidizes and deteriorates. However, as illustrated in FIG. 4, when the gap 10b is present in the inorganic matrix part 10, oxygen and water vapor may reach the inside of the inorganic matrix part 10 through the gap 10b and may contact with the organic fiber 20 inside the inorganic matrix part 10. Thus, from the viewpoint of preventing the oxidative deterioration of the organic fiber 20, preferably, the inorganic matrix part 10 does not have the gap 10b communicating from the surface 10a to the inside.

In the composite member 100, preferably, the inorganic matrix part 10 has a volume ratio larger than that of the organic fiber 20. Specifically, preferably, the ratio of the volume of the organic fiber 20 to the volume of the inorganic matrix part 10 ([volume of organic fiber]/[volume of inorganic matrix part]) is less than 20%. Increasing the volume ratio of the inorganic matrix part 10 more than that of the organic fiber 20 enables the periphery of the organic fiber 20 to be easily covered with particles 11 of the inorganic substance. Thus, from the viewpoint of further preventing the deterioration of the organic fiber 20, preferably, the inorganic matrix part 10 has a volume ratio larger than that of the organic fiber 20.

As described above, the composite member 100 according to the present embodiment includes the inorganic matrix part 10 made from an inorganic substance containing at least one of a metal oxide or a metal oxide hydroxide. The composite member 100 further includes the organic fiber 20 that is directly fixed to the inorganic matrix part 10 without interposing an adhesive substance different from the inorganic substance making up the inorganic matrix part 10 and is present in a dispersed state within the inorganic matrix part 10. The composite member 100 has a porosity of 20% or less in the cross section of the inorganic matrix part 10. In the composite member 100, the organic fiber 20 is dispersed within the inorganic matrix part 10, thereby connecting the particles 11 of the inorganic substance each other and enhancing the mechanical strength and toughness of the composite member 100. Since the porosity in the cross section of the composite member 100 is 20% or less, the organic fiber 20 is prevented from contacting with oxygen and water vapor, which enables the organic fiber 20 to be stably dispersed for a long time.

[Method for Manufacturing Composite Member]

Next, a method for manufacturing the composite member according to the present embodiment is described. The composite member is manufactured by pressurizing and heating a mixture of particles of the inorganic substance and the organic fiber 20 in a state containing a solvent. By using such a pressure heating method, particles of the inorganic substance bond with each other, forming the inorganic matrix part 10.

Specifically, first, a powder of the inorganic substance and the organic fiber 20 are mixed to prepare a mixture. The method for mixing the powder of the inorganic substance and the organic fiber 20 is not limited and may be carried out by a dry or wet process. The powder of the inorganic substance and the organic fiber 20 may be mixed in air or in an inert atmosphere.

Preferably, the powder of the inorganic substance here has an average particle size $D_{50}$ within a range of 300 nm to 50 μm. Such an inorganic substance is not only easy to handle but also has a relatively large specific surface area, so that the contact area among particles increases when the mixture is pressurized. This acts to enhance the bonding force among particles of the inorganic substance and improves the densification of the inorganic matrix part 10.

Next, a solvent is added to the mixture. The solvent is not limited, but for example, one dissolving a part of the inorganic substance when the mixture is pressurized and heated is usable. As the solvent, one reacting with the inorganic substance to form another inorganic substance different from said inorganic substance is usable. As such a solvent, at least one selected from the group consisting of an acidic aqueous solution, an alkaline aqueous solution, water, an alcohol, a ketone, and an ester is usable. As the acidic aqueous solution, an aqueous solution with a pH of 1 to 3 is usable. As the alkaline aqueous solution, an aqueous solution with a pH of 10 to 14 is usable. As the acidic aqueous solution, preferably, an aqueous solution of an organic acid is used. As the alcohol, preferably, an alcohol with 1 to 12 carbon atoms is used.

The mixture containing the inorganic substance, the organic fiber 20, and the solvent is then filled inside the mold. After filling the mold with the mixture, the mold may be heated as necessary. Then, by applying pressure to the mixture inside the mold, the inside of the mold becomes a high pressure state. At this time, the inorganic substance and the organic fiber 20 are densified, and at the same time, particles of the inorganic substance bond with each other.

When a solvent that dissolves a part of an inorganic substance is used, an inorganic compound making up the inorganic substance is dissolved in the solvent under high pressure. The dissolved inorganic compound penetrates a gap between the inorganic substance and the organic fiber 20, a gap among the inorganic substance, and a gap among the organic fiber 20. Then, the solvent in the mixture is removed in this state to form a connection part derived from the inorganic substance between the inorganic substance and the organic fiber 20, among the inorganic substance, and among the organic fiber 20. When a solvent that reacts with an inorganic substance to form another inorganic substance different from said inorganic substance is used, an inorganic compound making up the inorganic substance reacts with the solvent under high pressure. Then, the other inorganic substance generated by the reaction is filled in the gap between the inorganic substance and the organic fiber 20, the gap among the inorganic substance, and the gap among the organic fiber 20 to form a connection part derived from the other inorganic substance.

When a solvent that dissolves a part of an inorganic substance is used, heating and pressurizing conditions of the mixture containing the inorganic substance, the organic fiber 20, and the solvent are not limited as long as the conditions are such that dissolution of the surface of the inorganic substance progresses. When a solvent that reacts with an inorganic substance to form another inorganic substance different from said inorganic substance is used, heating and pressurizing conditions of the mixture are not limited as long as the reaction between the inorganic substance and the solvent proceeds. For example, preferably, the mixture containing the inorganic substance, the organic fiber 20, and the solvent is heated to 50 to 300° C. and then pressurized at a pressure of 10 to 600 MPa. Note that the temperature at which the mixture containing the inorganic substance, the organic fiber 20, and the solvent is heated is more preferably 80 to 250° C., still more preferably 100 to 200° C. The pressure at which the mixture containing the inorganic substance, the organic fiber 20, and the solvent is pressurized is more preferably 50 to 400 MPa, still more preferably 50 to 200 MPa. Limiting the heating temperature to such a numerical range prevents the organic fiber from changing in quality and disappearing and provides a desired composite member in which the inorganic matrix part and the organic fiber are combined. Limiting the pressure to such a numerical range provides a composite member that is dense and has internal strain prevented.

Then, by taking out the molded body from the inside of the mold, the composite member is obtained. Note that, preferably, the connection part derived from the inorganic substance formed between the inorganic substance and the organic fiber 20, among the inorganic substance, and among the organic fiber 20 is the amorphous part 30 described above.

As a method for manufacturing an inorganic member made from a ceramic, a sintering method has been known. The sintering method is a method for obtaining a sintered body by heating an aggregate of a solid powder made from an inorganic substance at a temperature lower than the melting point. However, in the sintering method, the solid powder is heated to 1000° C. or higher, for example. Therefore, when the sintering method is used to obtain a composite member made from the inorganic substance and the organic fiber, the organic fiber carbonizes due to heating at a high temperature, obtaining no composite member. However, in the manufacturing method for the composite member according to the present embodiment, the mixture formed by mixing the powder of the inorganic substance and the organic fiber 20 is heated at a low temperature of 300° C. or less, and thus the organic fiber 20 hardly carbonizes. This enables the organic fiber 20 to be directly fixed to the inorganic matrix part 10 made from the inorganic substance.

Further, in the manufacturing method according to the present embodiment, since the mixture of the powder of the inorganic substance and the organic fiber 20 is pressurized while being heated, the inorganic substance is aggregated to form the inorganic matrix part 10 that is dense. As a result, the number of pores inside the inorganic matrix part 10 is reduced, and thus the composite member 100 is obtained that has high strength.

Next, a method for manufacturing the composite member 100 is described in which the inorganic substance making up the inorganic matrix part 10 is boehmite. The composite member 100 in which the inorganic substance is boehmite is produced by mixing a hydraulic alumina, the organic fiber 20, and a solvent containing water, and then pressurizing and heating the mixture. The hydraulic alumina is an oxide obtained by heat-treating an aluminum hydroxide and contains p alumina. Such a hydraulic alumina has the property of bonding and curing by hydration reaction. Therefore, by using the pressure heating method, the hydration reaction of the hydraulic alumina progresses to have the hydraulic alumina bonded to each other while the crystal structure is changed to boehmite, so that the inorganic matrix part 10 is formed.

Specifically, a hydraulic alumina powder, the organic fiber 20, and a solvent containing water are first mixed to prepare a mixture. Preferably, the solvent containing water is pure water or ion exchange water. However, the solvent containing water may contain an acidic substance or an alkaline substance, in addition to water. As long as the solvent containing water contains water as a main component, it may contain, for example, an organic solvent (for example, an alcohol).

Preferably, the amount of the solvent added to the hydraulic alumina is an amount in which the hydration reaction of the hydraulic alumina sufficiently progresses. The amount of the solvent added is preferably 20 to 200% by mass to the hydraulic alumina, more preferably 50 to 150% by mass to the hydraulic alumina.

Next, the mixture formed by mixing the hydraulic alumina, the organic fiber 20, and the solvent containing water is filled inside the mold. After filling the mold with the mixture, the mold may be heated as necessary. By applying pressure to the mixture inside the mold, the inside of the mold becomes a high pressure state. At this time, the hydraulic alumina becomes highly filled, and particles of the hydraulic alumina bond with each other, resulting in high density. Specifically, by adding water to the hydraulic alumina, the hydraulic alumina undergoes a hydration reaction to form boehmite and an aluminum hydroxide on the surface of particles of the hydraulic alumina. By pressurizing the mixture in the mold while heating, the boehmite and the aluminum hydroxide generated mutually diffuse among adjacent hydraulic alumina particles, so that the hydraulic alumina particles gradually bond with each other. Then, the dehydration reaction proceeds by heating, and the crystal structure changes from an aluminum hydroxide to boehmite. It is supposed that the hydration reaction of the hydraulic alumina, the mutual diffusion among the hydraulic alumina particles, and the dehydration reaction proceed almost simultaneously.

When the molded body is taken out from the inside of the mold, the composite member 100 is obtained in which the particles 11 bond with each other via at least one of the oxide or the oxide hydroxide of aluminum while the organic fiber 20 is fixed each other.

Heating and pressurizing conditions of the mixture formed by mixing the hydraulic alumina, the organic fiber 20, and the solvent containing water are not limited as long as the reaction between the hydraulic alumina and the solvent progresses. For example, preferably, the mixture formed by mixing the hydraulic alumina, the organic fiber 20, and the solvent containing water is pressurized at a pressure of 10 to 600 MPa while being heated to 50 to 300° C. Note that the temperature at which the mixture formed by mixing the hydraulic alumina, the organic fiber 20, and the solvent containing water is heated is more preferably 80 to 250° C., still more preferably 100 to 200° C. The pressure at which the mixture formed by mixing the hydraulic alumina, the organic fiber 20 and the solvent containing water is pressurized is more preferably 50 to 600 MPa, still more preferably 200 to 600 MPa.

As described above, the method for manufacturing the composite member includes: a step of mixing the powder of the inorganic substance with the organic fiber 20 to obtain a mixture; and a step of adding a solvent dissolving an inorganic substance or a solvent reacting with the inorganic substance to the mixture, and then pressurizing and heating the mixture. Preferably, heating and pressurizing conditions of the mixture area temperature of 50 to 300° C. and a pressure of 10 to 600 MPa. In the manufacturing method according to the present embodiment, since the composite member 100 is formed under such a low temperature condition, carbonization of the organic fiber 20 is prevented, and thus the organic fiber 20 is directly fixed to the inorganic matrix part 10.

The method for manufacturing the composite member 100 in which the inorganic substance is boehmite includes: a step of mixing the hydraulic alumina, the organic fiber 20, and the solvent containing water to obtain a mixture; and a step of pressurizing and heating the mixture. Preferably, heating and pressurizing conditions of the mixture are a temperature of 50 to 300° C. and a pressure of 10 to 600 MPa. In this manufacturing method, the composite member 100 is formed under such a low temperature condition, and thus the obtained member is mainly made from boehmite phase. Therefore, the composite member 100 that is lightweight and excellent in chemical stability is obtained by a simple method.

[Composite Member Usage]

Next, the usage of the composite member 100 according to the present embodiment is described. As described above, the composite member 100 has high mechanical strength and is formable as a plate shape having a large thickness, and thus it is usable for a structural object. Preferably, a structural object including the composite member 100 is a housing facility, a housing member, a building material, or a building. The housing facility, the housing member, the building material, and the building are structural objects that are in high demand in human life, and thus using the composite member 100 in structural objects is expected to have creation effects of a new large market.

The composite member according to the present embodiment is usable for building materials. In other words, the building member according to the present embodiment includes the composite member 100. The building member is a member manufactured for building, and the composite member 100 is usable at least in part in the present embodiment. As described above, the composite member 100 is formable in a plate shape having a large thickness and has high strength and durability. Therefore, the composite member 100 is suitably usable as a building member. Examples of the building member include an outer wall material (siding) and a roof material. Examples of the building member also include a road material and an outer groove material.

The composite member according to the present embodiment is usable as an interior member. In other words, the interior member according to the present embodiment includes the composite member 100. Examples of the interior member include a bathtub, a kitchen counter, a washstand, and a floor material.

EXAMPLES

The composite member according to the present embodiment is described in more detail with reference to examples below, but the present embodiment is not limited thereto.

[Preparation of Test Samples]

Example 1

Zinc oxide particles having an average particle size $D_{50}$ of about 1 μm (manufactured by Kojundo Chemical Laboratory Co., Ltd., purity 99.99%) were prepared as the inorganic particles. A cellulose nanofiber, Cellenpia (registered trademark) CS-01 (carboxymethylated cellulose nanofiber) manufactured by NIPPON PAPER INDUSTRIES CO., LTD. was prepared as the organic fiber. After a powder of the cellulose nanofiber was weighed to be 5% by volume to the zinc oxide particles, the zinc oxide particles and the organic fiber powder were mixed using a mortar and pestle made of agate to obtain a mixed powder.

Next, the obtained mixture was put into a cylindrical mold (φ10) having an internal space. Further, 1 M of acetic acid was added to the mixture filled inside the mold to be 20% by mass to the zinc oxide particles. Then, the test sample of this example was obtained by heating and pressurizing the mixture containing the acetic acid under the condition of 100 MPa, 150° C., and 30 minutes.

Example 2

A test sample of this example was obtained in the same manner as in example 1 except that the cellulose nanofiber powder was added to be 10% by volume to the zinc oxide particles.

Example 3

A test sample of this example was obtained in the same manner as in example 1 except that the cellulose nanofiber powder was added to be 15% by volume to the zinc oxide particles.

Comparative Example 1

A test sample of this example was obtained in the same manner as in example 1 except that the cellulose nanofiber powder was not added.

Table 1 summarizes the amount of the cellulose nanofiber added to each of the test samples of examples 1 to 3 and comparative example 1.

TABLE 1

| | Comparative example 1 | Example 1 | Example 2 | Example 3 |
|---|---|---|---|---|
| Addition amount of CNF powder to ZnO (% by volume) | 0 | 5 | 10 | 15 |
| Maximum flexural stress (MPa) | 7.1 | 35 | 34.5 | 17.2 |
| Density ratio (%) | 91.5 | 92 | 83.1 | 83.8 |

[Evaluation of Test Samples]
(Flexural Strength Measurement)

Flexural strength of each of the test samples was measured in accordance with Japanese Industrial Standard JIS R1601 (Testing method for flexural strength (modulus of rupture) of fine ceramics at room temperature). Note that the flexural strength of each of the test samples was measured by a three-point flexural strength test method of JIS R1601. A maximum value of a stress in each of the test samples of the examples is illustrated together in Table 1.

As illustrated in Table 1, it is seen that the addition of the cellulose nanofiber, which is an organic fiber, increases the flexural stress and improves the mechanical strength. In particular, when the amount of the cellulose nanofiber added to the zinc oxide is 5 to 10% by volume, the flexural stress is improved by about 5 times compared to the case without the addition of the cellulose nanofiber.

(Density Ratio Measurement)

First, the specific gravity was determined from the volume and mass of each of the test samples of examples. Since the specific gravity of the zinc oxide was 5.6, and that of the cellulose nanofiber was 1.4, the theoretical specific gravity of each of the test samples was determined. That is, in the case of the test sample of example 1, since the volume ratio of the zinc oxide is 95%, and the volume ratio of the cellulose nanofibers is 5%, the theoretical specific gravity is 5.6×0.95+1.4×0.05=5.39. Then, the actual specific gravity to the theoretical specific gravity ([actual specific gravity]/[theoretical specific gravity]×100) was defined as the density ratio (%). The density ratio of each of the test samples is illustrated together in Table 1.

As illustrated in Table 1, it is seen that the density ratio decreases as the amount of the cellulose nanofiber added increases. That is, the actual specific gravity decreases compared to the theoretical specific gravity of the test sample. This may be due to an increase of pores as the ratio of the cellulose nanofiber increases. Therefore, preferably, the amount of the organic fiber added is adjusted so that the porosity does not exceed 20%.

(Porosity Measurement)

Figure 5:
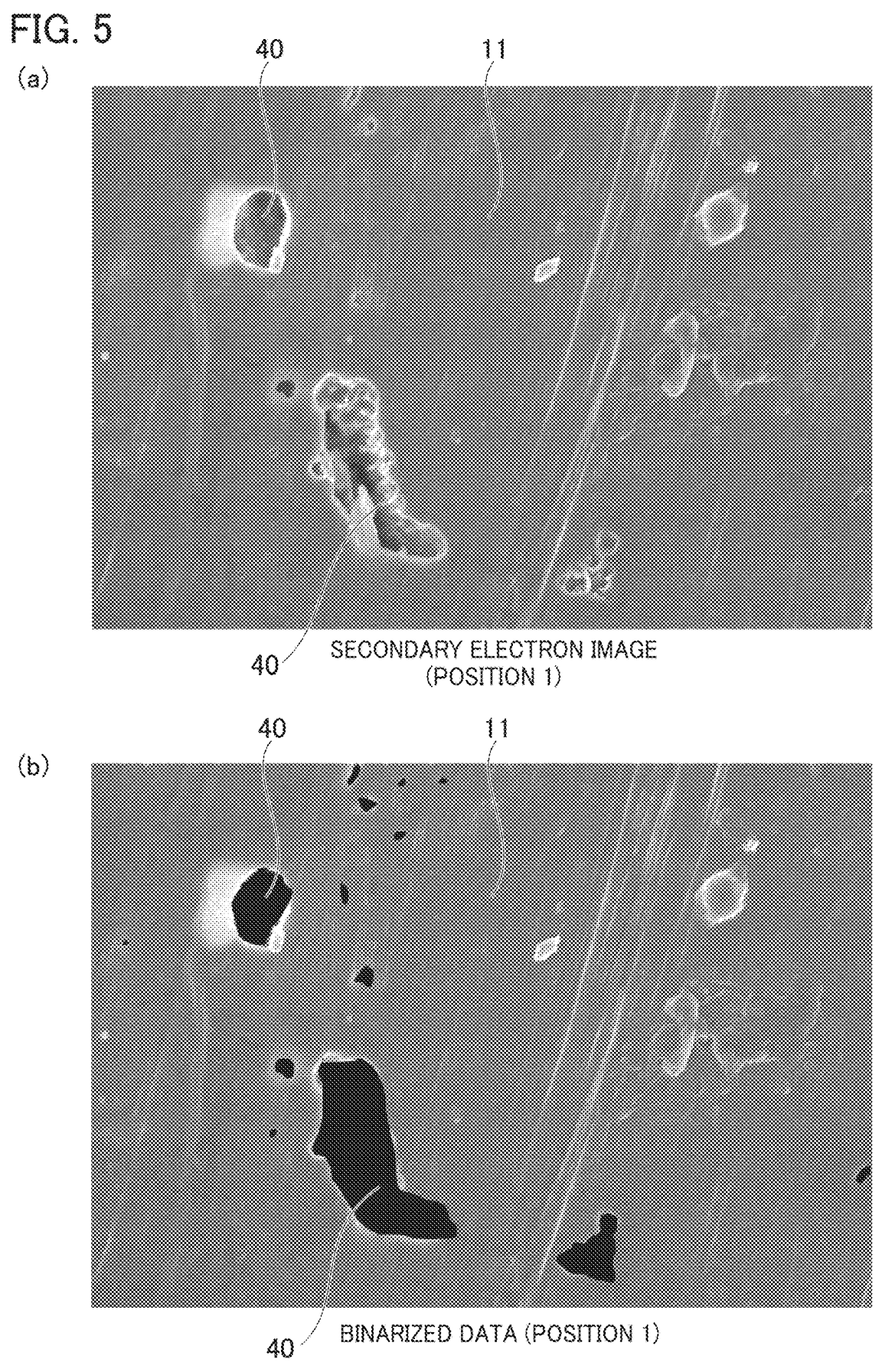

First, cross section polisher processing (CP processing) was applied to the section of the test sample of example 2, which is cylindrical. Next, using a scanning electron microscope (SEM), a secondary electron image was observed at a magnification of 20,000 on the section of the test sample. FIGS. 5(*a*), 6(*a*), and 7(*a*) illustrate secondary electron images obtained by observing three points (positions 1 to 3) in the section of the test sample of example 2. In the observed secondary electron images, a gray portion indicates the zinc oxide (particles 11 of the inorganic substance), and a black portion indicates pores 40. Although it cannot be confirmed in FIGS. 5, 6, and 7, the fine cellulose nanofiber is dispersed among the zinc oxide particles 11.

Figure 6:
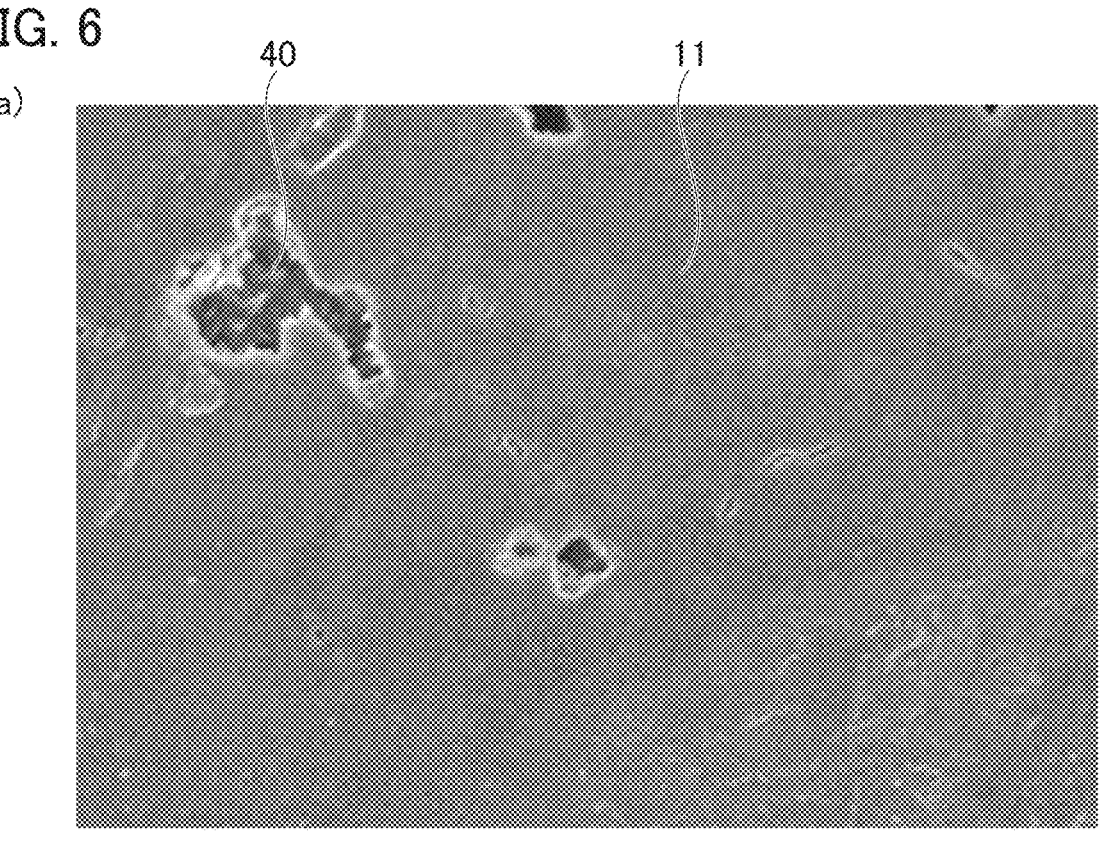
FIG. 6(*a*) is a diagram illustrating a secondary electron image at position 2 in a test sample according to example 2.
Figure 6:
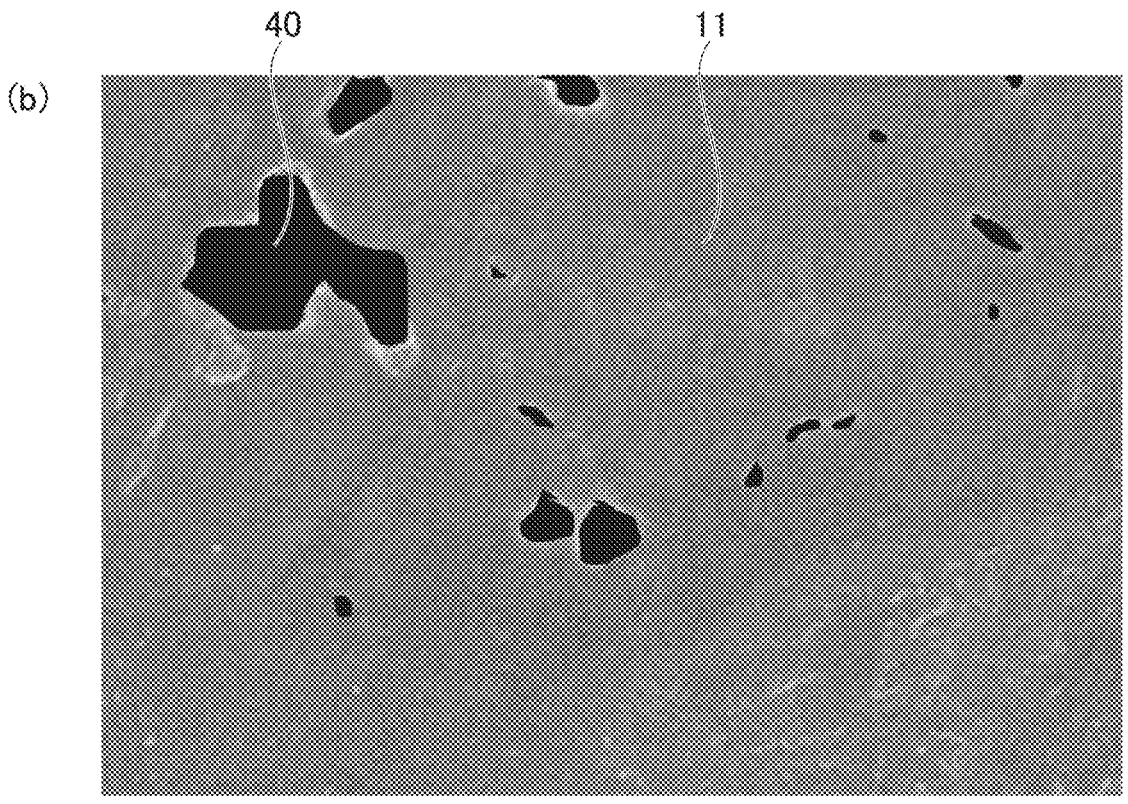
Figure 7:
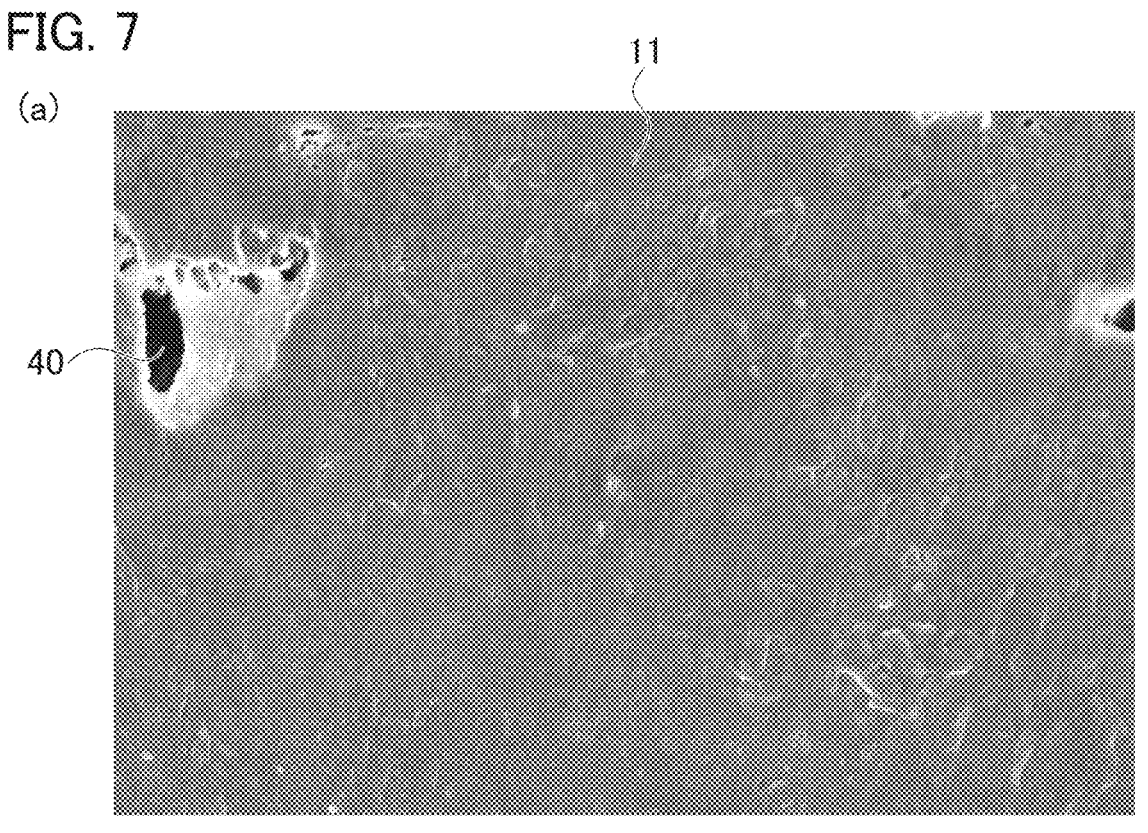
FIG. 7(*a*) is a diagram illustrating a secondary electron image at position 3 in a test sample according to example 2.
Figure 7:
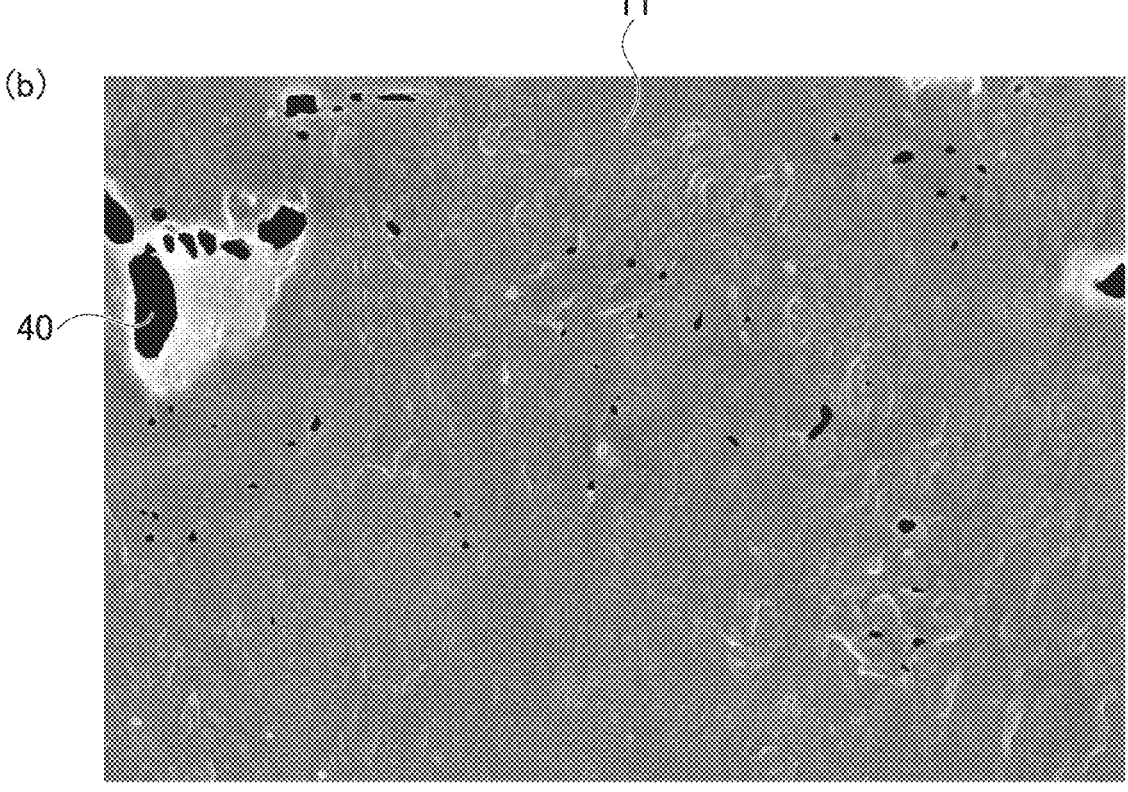

Next, by binarizing the SEM images of the three fields, the pore portions were clarified. The binarized images of the secondary electron images of FIGS. 5(*a*), 6(*a*), and 7(*a*) are illustrated in FIGS. 5(*b*), 6(*b*), and 7(*b*), respectively. Then, the area ratio of the pore portion was calculated from the binarized images, and the average value was taken as the porosity. Specifically, in FIG. 5(*b*), the area ratio of the pore portion at position 1 was 4.6%. In FIG. 6(*b*), the area ratio of the pore portion at position 2 was 4.4%. In FIG. 7(*b*), the area ratio of the pore portion at position 3 was 1.6%. Therefore, the porosity of the test sample of example 2 was 3.5%, which is the average value of the area ratio of the pore portion at positions 1 to 3.

From FIGS. 5, 6, and 7, the porosity of the test sample of example 2 is 20% or less, which indicates that the organic fiber is prevented from contacting with air and water vapor, thus preventing oxidative deterioration.

Although the contents according to the present embodiment have been described above with reference to the examples, it is obvious to those skilled in the art that the present embodiment is not limited to these descriptions and that various modifications and improvements are possible.

The entire contents of Japanese Patent Application No. 2019-178350 (filed on: Sep. 30, 2019) are incorporated herein by reference.

INDUSTRIAL APPLICABILITY

According to the present disclosure, there is provided a composite member that is stable for a long time and further has excellent mechanical strength, even when an organic fiber is used.

REFERENCE SIGNS LIST

10 Inorganic matrix part
20 Organic fiber
100 Composite member
The invention claimed is:

1. A composite member comprising:
an inorganic matrix part comprising multiple particles made from an inorganic substance including at least one of a metal oxide or a metal oxide hydroxide, the particles of the inorganic substance bonding with each other to form the inorganic matrix part; and
an organic fiber that is directly fixed to the inorganic matrix part without interposing an adhesive substance different from the inorganic substance making up the inorganic matrix part and is present in a dispersed state within the inorganic matrix part,
wherein the particles of the inorganic substance bond with each other via a connection part derived from the inorganic substance,
wherein the inorganic substance is a polycrystalline substance, and the connection part is an amorphous part containing an amorphous inorganic compound,
wherein the particles of the inorganic substance and the amorphous part contain the same metal element, wherein the composite member has a porosity of 20% or less in a section of the inorganic matrix part,
wherein a ratio of a volume of the organic fiber to a volume of the inorganic matrix part is less than 20%, and
wherein the inorganic matrix part contains no hydrate.

2. The composite member according to claim 1, wherein the composite member has a porosity of 10% or less in a section of the inorganic matrix part.

3. The composite member according to claim 1, wherein the organic fiber is a petroleum-derived substance or a plant-derived substance.

4. The composite member according to claim 1, wherein the organic fiber is a cellulose nanofiber.

5. The composite member according to claim 1, wherein the inorganic substance contains at least one of zinc oxide or boehmite in an amount of 50 mol % or more.

6. The composite member according to claim 1, wherein the inorganic substance making up the inorganic matrix part does not contain a hydrate of a calcium compound, phosphate cement, zinc phosphate cement, and calcium phosphate cement.

7. The composite member according to claim 1, wherein an average particle size of the particles of the inorganic substance making up the inorganic matrix part is from 300 nm to 50 μm.

8. The composite member according to claim 1, wherein a fiber length of the organic fiber is from 1 nm to 10 mm, and a fiber diameter of the organic fiber is 1 nm to 1 mm.

9. The composite member according to claim 1, wherein a thickness of the inorganic matrix part is 50 μm or more.

10. A composite member comprising:
an inorganic matrix part comprising multiple particles made from an inorganic substance including at least one of a metal oxide or a metal oxide hydroxide, the particles of the inorganic substance bonding with each other to form the inorganic matrix part; and
an organic fiber that is directly fixed to the inorganic matrix part without interposing an adhesive substance different from the inorganic substance making up the inorganic matrix part and is present in a dispersed state within the inorganic matrix part,
wherein the particles of the inorganic substance bond with each other via a connection part derived from the inorganic substance,
wherein the inorganic substance is a polycrystalline substance, and the connection part is an amorphous part containing an amorphous inorganic compound,
wherein the particles of the inorganic substance and the amorphous part contain the same metal element,
wherein the composite member has a porosity of 20% or less in a section of the inorganic matrix part,
wherein a ratio of a volume of the organic fiber to a volume of the inorganic matrix part is less than 20%, and
wherein the inorganic substance contains at least one of zinc oxide or boehmite in an amount of 50 mol % or more.

* * * * *